United States Patent Office 3,826,754
Patented July 30, 1974

3,826,754
CHEMICAL IMMOBILIZATION OF FISSION PRODUCTS REACTIVE WITH NUCLEAR REACTOR COMPONENTS
Leonard N. Grossman, Livermore, Alexis I. Kaznoff, Castro Valley, and Howard V. Clukey, Saratoga, Calif., assignors to General Electric Company
No Drawing. Filed June 16, 1971, Ser. No. 153,897
Int. Cl. G21c 3/62
U.S. Cl. 252—301.1 R       30 Claims

ABSTRACT OF THE DISCLOSURE

This invention teaches a method of immobilizing deleterious fission products produced in nuclear fuel materials during nuclear fission chain reactions through the use of additives. The additives are disposed with the nuclear fuel materials in controlled quantities to form new compositions preventing attack of reactor components, especially nuclear fuel clad, by the deleterious fission products.

BACKGROUND OF THE INVENTION

This invention relates in general to a method of immobilizing fission products capable of deleterious reaction with nuclear reactor components and more particularly to a method of incorporating additives in nuclear fuel assemblies which additives associate with fission products of uranium and plutonium and prevent the fission products from attacking nuclear reactor components especially nuclear fuel clad.

Nuclear reactors are presently being designed, constructed and operated in which the fissionable material or nuclear fuel is contained in fuel elements which may have various geometric shapes, such as plates, tubes or rods. The fuel material is usually enclosed in a corrosion-resistant, non-reactive, heat conductive container or clad which as assembled with the fuel material is called a fuel element. The fuel elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium), certain magnesium alloys and others. The failure of the clad, due to the buildup of gas pressure or high temperatures in the fuel, or due to corrosion of the clad by deleterious fission products, can contaminate the coolant or moderator and the associated steam systems with intensely radioactive long-lived products to a degree which interferes with plant operation.

In general, during operation of a nuclear powered reactor, a fissionable atom, such as U–233, U–235 or Pu–239, absorbs a neutron in its nucleus and undergoes a nuclear disintegration. This produces on the average, two fission products of lower atomic weight and great kinetic energy, and usually two or three high energy neutrons. For example the fission of U–235 produces a light fission product and a heavy fission product with mass numbers ranging between 80 and 110 and between 125 and 155 respectively, an average of 2.5 neutrons and some energetic gamma radiation. Some of the foregoing fission products (either solely, jointly, or in combination with other elements present in a fuel element) have been determined to have deleterious effects on cladding materials. Representative of these deleterious fission products which have sufficient mobility in the nuclear fuel to migrate into contact with the clad are cesium, rubidium, iodine, and tellurium.

During operation of nuclear reactors it has been observed that over long periods of time, the fuel elements can be subject to failure in that the clad becomes corroded with release of radioactive products from the point of failure in the clad. Analyses of failed fuel elements have shown one prevalent cause of failure to be due to corrosion occurring inside the fuel element. This is felt to be due to the release of corrosive fission products inside the fuel element which products migrate into contact with the clad and enter into a reaction with the clad. When these deleterious fission products reach sufficiently high concentrations, these fission products can produce significant corrosion of the clad. Where the clad is a zirconium material such as a zirconium alloy, or a stainless steel alloy, the clad may be subjected to cesium-aided corrosion possibly resulting in the phenomenon known as liquid metal stress corrosion cracking. Cesium-aided corrosion is especially likely when the cesium is associated with small amounts of rubidium and small amounts of the fission product iodine with or without small amounts of common fuel and clad impurities such as fluorine, chlorine and oxygen and the hydroxyl ion from water. Iodine can also penetrate grain boundaries of clads made from zirconium alloys or stainless steel alloys. The occurrence of deleterious interaction between the clad and harmful fission products increases with length of time of operating the fuel element as more fission products are available for reaction with the clad. Other conditions which increase interaction between the clad and harmful fission products are the higher temperatures of the fuel during fission, the pressure of the fuel on the clad due to expansion of the fuel during fission, and the pressure of released fission gases (e.g., xenon and krypton) on the clad.

In addition nuclear fission products can have other deleterious effects. For example a primary purpose of immobilizing iodine fission products is to reduce the potential exposure of living organisms to the ionizing radiation from the radioactive iodines which might otherwise escape from the fuel elements in the event of a failure and even from the reactor. In this manner personnel inside and outside the reactor plant would be protected from the biological effects of the ionizing radiation from these iodine fission products.

Radioisotopes which escape from the fuel through leaking cladding may be largely retained within the reactor system, but can cause exposures of personnel from direct radiation through the reactor equipment or from intake into the body from exposure to leaks or spills. Radioisotopes released from the nuclear plant in abnormal accidents can cause similar direct and indirect exposures to persons outside the nuclear plant. Radioactive iodine (especially iodine-131) is one of the major contributors to such possible exposures, and there is a need to insure that it does not escape from the fuel to facilitate normal operations and further reduce the potential effects of accidents.

In the nuclear industry it is desirable to achieve protection of nuclear reactor components, especially nuclear clads, from the deleterious effects of fission products, especially the above-mentioned cesium, rubidium, iodine and tellurium fission products. While various approaches to this problem have been attempted, one of the most practical approaches has been finding additives which will chemically combine or associate with the undesirable fission products so that these products will not be free to migrate in the nuclear fuel clad for reaction with the clad to produce ultimate failure of the clad.

The selection of such additives is complicated by the many parameters which must be satisfied for a successful additive. The additive, both before and after combination with the fission products, should be relatively insoluble in hot water, relatively non-volatile and physically immobile in the nuclear fuel material at operating temperatures of fuel and clad, inert chemically with respect to the fuel and clad, and relatively free of effects on reactor neutron production and fuel handling. The additive should also be relatively inexpensive and should be compatible with current fuel production techniques.

OBJECTS OF THE INVENTION

Accordingly it is an object of this invention to provide additives for nuclear fuel materials which will chemically combine or associate with deleterious fission products preventing these products from migrating in the nuclear fuel to reach reactor components.

Another object of this invention is to provide the foregoing additives for nuclear fuel materials which have an additional feature of a low neutron absorption cross section.

Still another object of this invention is to provide the foregoing additives for nuclear fuel materials which are inexpensive and can be economically incorporated within a fuel element.

SUMMARY OF THE INVENTION

The foregoing objects and other objects and advantages apparent to a person having ordinary skill in the art are achieved by introducing an additive selected from low neutron absorption cross section materials which will chemically inert deleterious fission products resulting from the nuclear fission chain reactions of nuclear fuel materials. The additives associate with the fission products (i.e., the fission products are gettered by the additives) and immobilize the fission products, including cesium, rubidium, iodine and tellurium, either by forming solid solutions or through chemical reaction to form compounds. The additives can broadly be classified as metals, metallic oxides or mixed oxides and can be used with the customary nuclear fuels in whatever form the fuel is used including compounds of the nuclear fuel. The additives can be introduced into the fuel elements by various methods which enhance the use of these additives in nuclear fuels.

The additives of this invention can be used with nuclear fuel materials suitable for various types of nuclear reactors, such as fast reactors and thermal reactors including pressurized water reactors, boiling water reactors and gas cooled reactors. This invention is applicable to fissionable nuclear fuel materials such as isotopes of uranium, plutonium, thorium or mixtures thereof which fission by nuclear fission chain reaction and produce fission products from such reaction. The isotopes of uranium, plutonium, thorium, or mixtures thereof can be in the form of elements (metals) or compounds with representative compounds being oxides, carbides, silicides, nitrides, oxynitrides, carbonitrides, oxycarbides, etc. The additives of this invention in one preferred practice are employed with nuclear fuels in the oxide form.

Any of the additives enumerated in this invention may be incorporated alone or in combination with one or more of the other additives. The additives of this invention satisfy a number of parameters with the most important parameters being their ability to getter deleterious fission products and their low neutron absorption cross section which minimizes interference with the operation of the nuclear reactor. The additives of this invention have, both before and after combination with the fission products, a low solubility in hot water (water in the range of about 275 to about 400° C. as present in a thermal nuclear reactor during operating conditions), very low vapor pressure and very low partial pressure of the gettered fission product specie at reactor operating temperatures, physical immobility of the additives both before and after combination with the fission products in a large fraction of the fuel volume, chemically inert with respect to reaction with the fuel and clad and free of interference with the nuclear fission chain reaction.

The additives employed in the practice of this invention can be selected from four general classes of additives which will either associate with, or form stable compounds with, the fission products while having the parameters enumerated in the foregoing paragraph. The additives which getter fission products can be divided into four classes including (1) metallic oxides of low neutron absorption cross section cations with representative oxides being silicon dioxide, titanium dioxide and mixtures thereof; (2) ceramic compounds of mixed oxides having low neutron absorption cross sction cations with representative oxides being aluminum silicates (e.g., mullite), calcium silicates (e.g., $CaO \cdot SiO_2$, $3CaO \cdot 2SiO_2$, $2CaO \cdot SiO_2$), magnesium silicates (e.g. $MgO \cdot SiO_2$, $2MgO \cdot SiO_2$), silica-alumina-alkaline earth metal oxides (e.g., $CaO \cdot Al_2O_3 \cdot 2SiO_2$ and $2MgO \cdot 2Al_2O_3 \cdot 5SiO_2$), metallic titanates of group II, III or IV metals which form titanates (e.g., $CaTiO_3$, $Al_2TiO_5$ and $SiTiO_4$), calcia-silica titanates (e.g., $CaO \cdot 2SiO_2 \cdot TiO_2$) and mixtures and combinations of the foregoing; (3) cesium graphite compounds such as $C_{64}Cs$ and $C_{32}Cs$; (4) metals of low or moderately low neutron cross section which react with fission products such as cesium in the fuel environment including the metals of molybdenum and tungsten which can inert cesium and rubidium by forming cesium molybdates, cesium tungstates, etc., in oxide fuels under certain oxygen activity regimes.

Selected additives from the foregoing enumeration will associate with certain fission products so that it is an especially preferred teaching of this invention to use a combination of additives so that multiple fission products produced in nuclear fission chain reactions will be immobilized with elimination of the deleterious effects noted above in the Background of the Invention. By way of example and not serving to limit the teaching of this invention, it is contemplated to use an oxide material such as mullite or titania in combination with cesiated graphite as the oxide will serve to associate with and tie up deleterious metallic fission products such as cesium and rubidium and the cesiated graphite will associate with and tie up the deleterious non-metallic fission products such as iodine. Generally the four classes of additives can be characterized by their preferred association with one or more fission products in the nuclear fuel during nuclear fission chain reactions with the metallic oxides and mixed oxides tending to associate with and tie up metallic fission products including cesium and rubidium, the cesiated graphite compounds tending to associate with and tie up non-metallic fission products such as iodine as well as gettering cesium and rubidium.

Further by way of example, Table 1 is presented in which are listed some of the additives (or getters) from the foregoing discussion, the reaction products formed from a reaction of the getter with cesium and the estimated melting temperature of the reaction product. The criteria used are that the cesium compound formed is thermodynamically stable (Pressure $_{Cs} < 10^{-6}$ atmosphere) and refractory (solidus at $>1000°$ C.) in the presence of $UO_2$.

TABLE 1

| Getter | Reaction products with Cs | Estimated melting temperature of reaction product (° C.) |
|---|---|---|
| $CaO \cdot SiO_2$ $3CaO \cdot 2SiO_2$ $2CaO \cdot SiO_2$ | $Cs_2O \cdot 3CaO \cdot 6SiO_2$ or $Cs_2O \cdot CaO \cdot SiO_2$ | 1,200–1,500 |
| $2MgO \cdot SiO_2$ $MgO \cdot SiO_2$ | $Cs_2O \cdot MgO \cdot 2SiO_2$, $Cs_2O \cdot MgO \cdot 5SiO_2$, or $Cs_2O \cdot 5MgO \cdot 12SiO_2$ | 1,000–1,100 |
| $CaO \cdot Al_2O_3 \cdot 2SiO_2$ | $Cs_2O \cdot Al_2O_3 \cdot 2SiO_2$, or $Cs_2O \cdot 2CaO \cdot 3SiO_2$ | 1,100–1,300 |
| $2MgO \cdot 2Al_2O_3 \cdot 5SiO_2$ | $Cs_2O \cdot Al_2O_3 \cdot 4SiO_2$ | 1,500 |
| $CaO \cdot 2SiO_2 \cdot TiO_2$ | $Cs_2O \cdot TiO_2 \cdot 4SiO_2$ | 1,800 |

Generally the useful effects of fission product immobilization can be achieved with relative low concentrations of the additives of this invention being associated with the nuclear fuel. While any effective quantity of the additives may be used, it is preferred that generally about ½ to about 4 weight percent of additive be used with the nuclear fuel. In an especially preferred practice, from about ½ to about 2 weight percent of metallic oxides, from about ½ to about 2 weight percent of mixed oxides, from about 1 to about 4 weight percent of cesiated graphite and from about 1 to about 4 weight percent of metal may be added to the fuel elements for inertment of fission products resulting from fission of about each 2 atomic percent of the fissile atoms present in the fuel elements. Appreciably less than the foregoing quantities tends to be ineffective in achieving the immobilization of deleterious fission products, while appreciably more than the foregoing quantities adds an excessive amount of inert material in the fuel and occupies space which would be better occupied with fissile and/or fertile material.

The additives of this invention may be incorporated in the fuel element in any suitable manner and in several ways, such as incorporating the additives to fuel bearing raw materials (e.g., to the vapor, liquid or solid uranium-containing chemicals in a fuel manufacturing process), to the pellets in a pellet manufacturing process or to a powder to be subjected to a pellet compaction process or a vibratory compaction process. Typically the additives may be incorporated into the fuel material by mechanical blending, coprecipitation or introduction at any suitable point in the fuel manufacturing process. Further the additives may be located on the fuel as a coating including a coating on pellet forms of the fuel or on the inside of the clad adjacent the fuel with representative processes of achieving the foregoing including flame spraying and plating for the metallic additive. It is also possible to use liquid or vapor impregnation of the additives in pellet or powder fuels. Also the additives may be inserted in the form of foils or tubular sections to surround the fuel or as wafers of the additive between layers of the fuel, as thin pellets placed between fuel pellets, as a smear of molten metallic additive from a soldering tool or as a paste such as an epoxy paste. Also the additives may be added as volatile compounds (e.g., $SiCl_4$ and $TiCl_3$) or liquid mists (e.g., nitrate solutions of Al, Si, Ti, etc.) to the flame of gas phase reaction processes used to convert gases such as uranium hexafluoride to a solid such as uranium dioxide by flame reaction.

Where the fuel elements incorporate the additives of this invention, the fuel elements may have any desired configuration. Typically, the fuel elements could be in the form of right cylinders, plates, squares, etc. It is preferred that the nuclear fuel material be in the form of right cylindrical pellets which are enclosed in a tubular clad of a zirconium alloy. The swelling of pellets in the clad is accommodated by fabricating porosity into the fuel pellet. Also the pellet could have dished ends, axial openings, etc., to accommodate fission product swelling.

This invention achieves a chemical inerting of reactive fission products such as cesium, rubidium, iodine and tellurium since the additives introduced in the fuel elements form stable compounds or solid solutions incorporating the reactive fission products into the compounds or solutions. In this manner the additives prevent the potential clad-fission product interaction and increase the clad reliability and longevity. Further it is noted that the additives achieve an improvement of fuel performance for fast and thermal reactors.

DETAILED DESCRIPTION OF THE INVENTION

Details of the invention will become further apparent upon reference to the following description of preferred embodiments of the invention.

EXAMPLES 1–8

Reaction of candidate additives were conducted as follows. A tantalum capsule was constructed having an upper cylindrical volume 1 inch in diameter and 3 inches in height centered over and connected to a lower cylindrical volume ¼ inch in diameter and 4 inches in height. About 1 gram of liquid cesium was placed in the lower volume and the candidate additive in powder form was placed in the upper volume in either a molybdenum or a uranium dioxide crucible. The tantalum capsule was evacuated, sealed and heated in a two zone vacuum furnace. The upper zone of the furnace determines the temperature of the additive and the lower zone of the furnace is used to develop the desired cesium vapor pressure. The specimens were heated at the temperatures designated in Table 2 for about 100 hours.

The oxides listed in Table 2 have been demonstrated to react with cesium vapor to form cesium-containing compounds. The cesium pressures, reaction temperatures, and oxygen activities of the system during the observed reaction are also given. The oxygen activities were set by either excess $Mo(Mo/MoO_2)$ or by excess $UO_{2.003}$ present in the system.

TABLE 2.—DEMONSTRATED CESIUM GETTERS

| Example | Oxide | Cesium-bearing reaction products | Cesium pressure (atmos.) | Reaction temperature (° C.) | Partial molar oxygen free energy (kcal./mole $O_2$) |
|---|---|---|---|---|---|
| 1 | $SiO_2$ | $Cs_2O \cdot 2SiO_2 + Cs_2O \cdot 4SiO_2$ | 0.2 | 800 | −95 |
| 2 | $SiO_2$ | Same as above | 0.04 | 903 | −85 |
| 3 | $SiO_2$ | do | 0.05 | 800 | −80 |
| 4 | $SiO_2$ | do | 0.002 | 990 | −75 |
| 5 | $TiO_2$ | Unidentified phase, containing about 50 weight percent Cs. | 0.2 | 800 | −95 |
| 6 | $TiO_2$ | do | 0.04 | 903 | −85 |
| 7 | $3Al_2O_3 \cdot 2SiO_2$ | $Cs_2O \cdot Al_2O_3 \cdot 2SiO_2$ | 0.01 | 795 | −80 |
| 8 | Same | $Cs_2O \cdot Al_2O_3 \cdot 2SiO_2$ plus unknown phase | 0.002 | 990 | −75 |

EXAMPLE 9

A Zircaloy-2 tube 6 inches long and ½ inch in diameter autoclaved in water to provide a protective oxide coating was loaded with a 3 inch column of ½ inch long uranium dioxide fuel pellets enriched with 7.28 atomic percent of the U–235 isotope with the remainder being U–238 isotope. The pellets were cylindrical in shape having dimensions of 0.500 inch in height and 0.496 inch in diameter with a cylindrical cavity of 0.15 inch in diameter in the center of each pellet. All of the pellets had an additive of a mixture of silicon dioxide and alumina in an amount of ½ weight percent each. The additive was added as a powder to the $UO_2$ powder prior to sintering into the pellets. Cesium in the forms of cesium iodide and cesium molybdate plus uranium metal were added to the cylindrical cavities in each of the fuel pellets to simulate fission products resulting from 5 atomic percent U–235 burnup. The Zircaloy-2 tube was sealed at both ends with fusion welded Zircaloy-2 end caps.

The tube was introduced to a boiling water reactor for irradiation at a neutron flux of about $2.5 \times 10^{13}$ neutrons/cm.$^2$ second for about 50 days. The tube was removed from the reactor and the fuel pellets were removed from the tube for ceramographic and electron microprobe analyses, all this being done under conditions to guard against radiation exposure of personnel. The fuel pellets had an appearance microstructurally similar to fuel pellets in commercial reactors exposed to high burnup conditions for a high rated neutron flux fuel. The examination by microprobe scanning showed obvious and striking correlation of cesium and silicon content in the same location, indicating that the cesium had chemically combined with a silica-bearing phase in the fuel matrix. The cesium was associated with the silicon even in cool fuel areas where access of the cesium was thought to be difficult. The presence of alumina with the silicon and cesium was also confirmed by analysis. Cesium was felt to react with silica and alumina (mullite) to form a cesium aluminasilicate of composition $Cs_2O \cdot Al_2O_3 \cdot 2SiO_2$ under the conditions present in the fuel element.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. An oxide composition in compacted cylindrical pellet form for a nuclear reactor containing at least one fissionable isotope and an effective amount of a fission product immobilizing additive in the range of about ½ to about 4 weight percent selected from the group consisting of aluminum silicates, calcium silicates, magnesium silicates, silica-alumina-magnesia, silica-alumina-calcia, aluminum titanates, silicon titanates, calcia-silica-titanates, cesium graphite compounds, and mixtures thereof, said additive serving to immobilize the fission products resulting from nuclear fission chain reactions of the nuclear fuel material through a reaction between the fission products and the additive and preventing reaction of the fission products with the reactor components at reactor operating temperatures.

2. The composition of claim 1 in which the nuclear fuel material comprises compounds selected from the group consisting of uranium oxide compounds, plutonium oxide compounds, thorium oxide compounds and mixtures thereof.

3. The composition of claim 2 in which the nuclear fuel material comprises uranium oxide compounds.

4. The composition of claim 1 in which the immobilizing additive is a cesium graphite compound.

5. The composition of claim 1 in which the immobilizing additive is an aluminum silicate.

6. The composition of claim 1 in which the immobilizing additive is a calcium silicate.

7. The composition of claim 1 in which the immobilizing additive is a magnesium silicate.

8. The composition of claim 1 in which the immobilizing additive is silica-alumina-magnesia.

9. The composition of claim 1 in which the immobilizing additive is an aluminum titanate.

10. The composition of claim 1 in which the immobilizing additive is a calcia-silica titanate.

11. A method of immobilizing fission products reactive with reactor components produced in a nuclear fuel material of oxide composition in compacted cylindrical pellet form containing at least one fissionable isotope comprising the step of incorporating in the nuclear fuel material an effective amount of a fission product immobilizing additive in the range of about ½ to about 4 weight percent selected from the group consisting of aluminum silicates, calcium silicates, magnesium silicates, silica-alumina-magnesia, silica-alumina-calcia, aluminum titanates, silicon titanates, calcia-silica-titanates and cesium graphite compounds, and mixtures thereof, said additive serving to immobilize the fission products resulting from nuclear fission chain reaction of the nuclear fuel material through a reaction between the fission products and the additive.

12. The method of claim 11 in which the nuclear fuel material comprises compounds selected from the group consisting of uranium oxide compounds, plutonium oxide compounds, thorium oxide compounds and mixtures thereof.

13. The method of claim 11 in which the nuclear fuel comprises uranium oxide compounds.

14. The method of claim 11 in which the immobilizing additive is an aluminum silicate.

15. The method of claim 11 in which the immobilizing additive is a calcium silicate.

16. The method of claim 11 in which the immobilizing additive is a magnesium silicate.

17. The method of claim 11 in which the immobilizing additive is silica-alumina-magnesia.

18. The method of claim 11 in which the immobilizing additive is a cesium graphite compound.

19. The method of claim 11 in which the immobilizing additive is an aluminum titanate.

20. The composition of claim 1 in which the immobilizing additive is a silicon titanate.

21. The composition of claim 1 in which the nuclear fuel material is comprised of uranium dioxide.

22. The method of claim 11 in which the immobilizing additive is a silicon titanate.

23. The method of claim 11 in which the immobilizing additive is silica-alumina-calcia.

24. The method of claim 11 in which the nuclear fuel material is comprised of uranium dioxide.

25. The composition of claim 1 in which the additive is a ceramic compound of mixed oxides and the additive is present in the nuclear fuel material in an amount of about ½ to about 2 weight percent.

26. The composition of claim 1 in which the additive is a cesium graphite compound and the additive is present in the nuclear fuel material in an amount of about 1 to about 4 weight percent.

27. The method of claim 11 in which the additive is a ceramic compound of mixed oxide and the additive is present in the nuclear fuel material in an amount of about ½ to about 2 weight percent.

28. The method of claim 11 in which the additive is a cesium graphite compound and the additive is present in the nuclear fuel material in an amount of about 1 to about 4 weight percent.

29. The composition of claim 1 in which the immobilizing additive is silica-alumina-calcia.

30. The composition of claim 1 in which the nuclear fuel material is a mixture comprising plutonium dioxide and uranium dioxide.

(References on following page)

References Cited
UNITED STATES PATENTS

| | | | |
|---|---|---|---|
| 3,278,655 | 10/1966 | Bar | 252—301.1 |
| 3,475,340 | 10/1969 | Pollock | 252—301.1 |
| 3,567,646 | 3/1971 | Gray | 252—301.1 |
| 3,141,852 | 7/1964 | Dressler | 252—301.1 |
| 3,270,098 | 8/1966 | Bar et al. | 252—301.1 |
| 3,294,698 | 12/1966 | Bar et al. | 252—301.1 |
| 3,462,371 | 8/1969 | Robertson | 252—301.1 |

RUBEN EPSTEIN, Primary Examiner

U.S. Cl. X.R.

176—67; 264—05

UNITED STATES PATENT OFFICE
CERTIFICATE OF CORRECTION

Patent No. 3,826,754    Dated July 30, 1974

Inventor(s) Leonard N. Grossman et al

It is certified that error appears in the above-identified patent and that said Letters Patent are hereby corrected as shown below:

Column 4, line 33, "sction" should be --section--; and line 36, after "(e.g. " insert a comma. Column 5, line 10 of Table 1, "2SiO$_2$," should be --3SiO$_2$,-- and line 14 of Table 1, "$_2$SiO$_2$," should be --2SiO$_2$,--. Column 7, line 38, "aluminasilicate" should be --alumina-silicate--.

Signed and sealed this 7th day of January 1975.

(SEAL)
Attest:

McCOY M. GIBSON JR.
Attesting Officer

C. MARSHALL DANN
Commissioner of Patents